(12) United States Patent
Dotzler et al.

(10) Patent No.: US 11,498,463 B2
(45) Date of Patent: Nov. 15, 2022

(54) VEHICLE SEAT HAVING A PITCHING SPRING UNIT

(71) Applicant: GRAMMER AG, Amberg (DE)

(72) Inventors: Florian Dotzler, Hirschau (DE); Erwin Haller, Birgland (DE); Konstantin Krivenkov, Amberg (DE)

(73) Assignee: GRAMMER AG, Ursensollen (DE)

( * ) Notice: Subject to any disclaimer, the term of this patent is extended or adjusted under 35 U.S.C. 154(b) by 421 days.

(21) Appl. No.: 16/591,937

(22) Filed: Oct. 3, 2019

(65) Prior Publication Data

US 2020/0108750 A1   Apr. 9, 2020

(30) Foreign Application Priority Data

Oct. 4, 2018  (DE) .......................... 102018124507.6

(51) Int. Cl.
| | |
|---|---|
| *F16M 13/00* | (2006.01) |
| *B60N 2/50* | (2006.01) |
| *B60N 2/52* | (2006.01) |
| *B60N 2/54* | (2006.01) |

(52) U.S. Cl.
CPC ............. *B60N 2/505* (2013.01); *B60N 2/502* (2013.01); *B60N 2/508* (2013.01); *B60N 2/525* (2013.01); *B60N 2/544* (2013.01); *B60N 2/546* (2013.01)

(58) Field of Classification Search
CPC ........ B60N 2/502; B60N 2/508; B60N 2/525; B60N 2/544
See application file for complete search history.

(56) References Cited

U.S. PATENT DOCUMENTS

| | | | | |
|---|---|---|---|---|
| 4,151,973 A | * | 5/1979 | Sedlock ................. | B60N 2/508 248/576 |
| 5,957,426 A | * | 9/1999 | Brodersen .............. | B60N 2/505 248/564 |

(Continued)

FOREIGN PATENT DOCUMENTS

| | | |
|---|---|---|
| DE | 102009031417 | 1/2011 |
| DE | 102009041811 | 4/2011 |
| FR | 912187 | 8/1946 |

OTHER PUBLICATIONS

Official Action for German Patent Application No. 102018124507.6, dated Jun. 6, 2019, 3 pages.

(Continued)

*Primary Examiner* — Amy J. Sterling
(74) *Attorney, Agent, or Firm* — Sheridan Ross P.C.

(57) ABSTRACT

Vehicle seat having a pitching spring unit, a vehicle seat upper part and a vehicle seat lower part of the vehicle seat being connected such that they can be moved relative to one another by means of a scissor frame arrangement, comprising a first scissor arm and a second scissor arm which cross in a first region as viewed in a vehicle seat width direction, the pitching spring unit comprising a spring element carrier and a spring element, the spring element being connected on one side to the vehicle seat upper part, the vehicle seat lower part or the scissor arms and on the other side to the spring element carrier which is connected to the first scissor arm such that it can be rotated about a second rotational axis and to the second scissor arm such that it can be rotated about a third rotational axis.

11 Claims, 13 Drawing Sheets

(56) References Cited

U.S. PATENT DOCUMENTS

| | | | | |
|---|---|---|---|---|
| 7,413,158 B1* | 8/2008 | Burer | ............... | B60N 2/42736 |
| | | | | 248/564 |
| 7,988,232 B2* | 8/2011 | Weber | ................ | B60N 2/508 |
| | | | | 384/58 |
| 11,285,846 B2* | 3/2022 | Dotzler | ................ | B60N 2/522 |
| 2007/0295882 A1* | 12/2007 | Catton | ................ | B60N 2/544 |
| | | | | 267/64.19 |
| 2011/0226930 A1* | 9/2011 | Enns | .................... | B60N 2/509 |
| | | | | 248/588 |
| 2011/0284713 A1* | 11/2011 | Ellerich | ............... | B60N 2/502 |
| | | | | 248/421 |
| 2012/0091773 A1 | 4/2012 | Lorey | | |
| 2013/0206949 A1* | 8/2013 | Archambault | ......... | B60N 2/508 |
| | | | | 248/421 |
| 2015/0232004 A1* | 8/2015 | Haller | ................ | B60N 2/501 |
| | | | | 248/560 |
| 2019/0009697 A1* | 1/2019 | Lorey | ................ | B60N 2/508 |

OTHER PUBLICATIONS

Expanded Search Report for European Patent Application No. 19200993.4, dated Apr. 1, 2020, 3 pages.

Official Action with English Translation for China Patent Application No. 201910950541.3, dated Sep. 6, 2021, 8 pages.

* cited by examiner

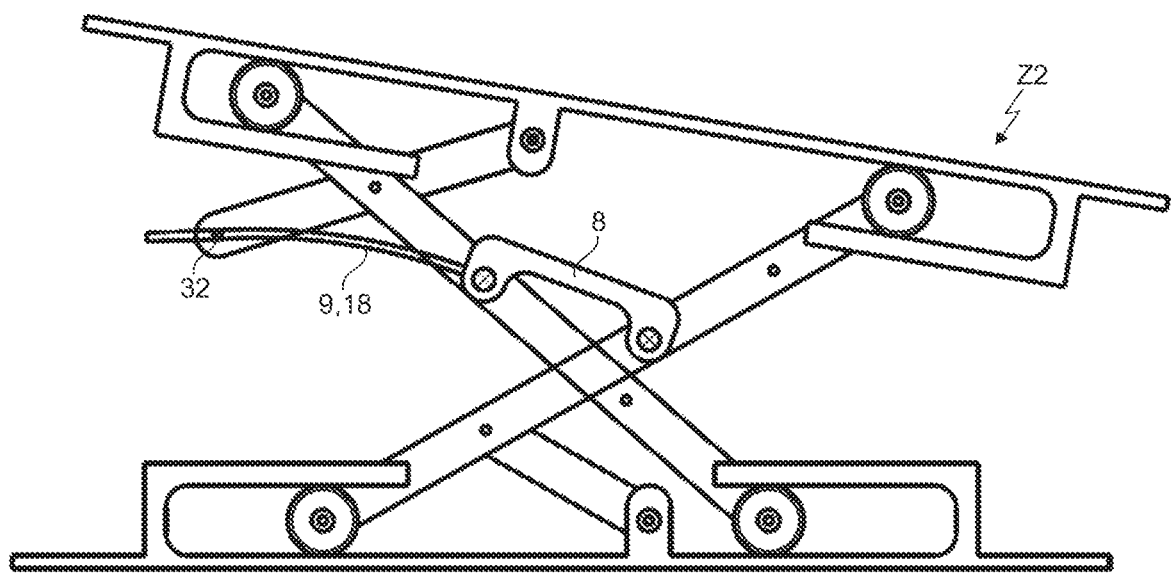
Fig. 5B
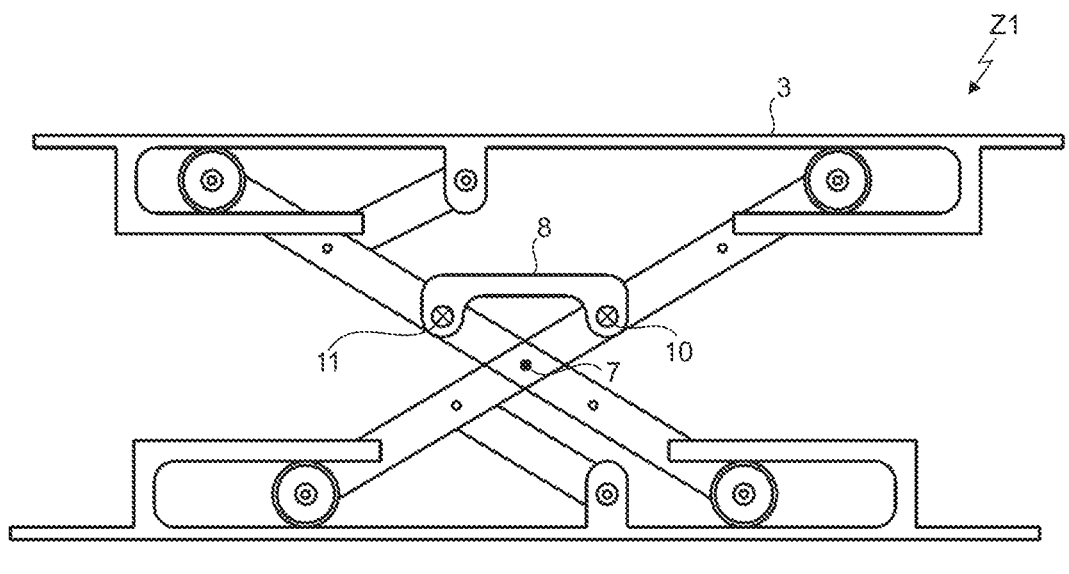
Fig. 6A
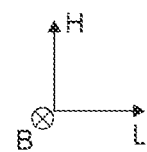

VEHICLE SEAT HAVING A PITCHING SPRING UNIT

CROSS-REFERENCE TO RELATED APPLICATION

This application claims the benefit of German Patent Application No. DE 10 2018 124 507.6 filed Oct. 4, 2018, the entire disclosure of which is incorporated herein by reference.

FIELD

The invention relates to a vehicle seat having a pitching spring unit, a vehicle seat upper part and a vehicle seat lower part of the vehicle seat being connected such that they can be moved relative to one another by means of a scissor frame arrangement, comprising a first scissor arm and a second scissor arm which cross in a region as viewed in the vehicle seat width direction.

BACKGROUND

Vehicle seats having pitching spring units are known from the prior art, such as, for example, from DE 2010 034 857 A1. Pitching spring systems of this type are difficult to realise, however, and need a considerably increased space requirement both in the X-direction and in the Y-direction on account of their configuration in the case of a pitching movement.

It is therefore an object of the present invention to provide a vehicle seat having a pitching spring unit which is of structurally simpler configuration than that shown in the prior art.

SUMMARY

The object on which the present application is based is achieved by way of the features of patent claim 1.

It is a core concept of the present invention to provide a vehicle seat having a pitching spring unit, a vehicle seat upper part and a vehicle seat lower part being connected such that they can be moved relative to one another by means of a scissor frame arrangement, comprising a first scissor arm and a second scissor arm which cross in a first region as viewed in the vehicle seat width direction, the pitching spring unit comprising a spring element carrier and a spring element, the spring element being connected on one side to the vehicle seat upper part, the vehicle seat lower part or the scissor arms and on the other side to the spring element carrier which is connected to the first scissor arm such that it can be rotated about a second rotational axis and to the second scissor arm such that it can be rotated about a third rotational axis.

In the case of a relative movement of the vehicle seat upper part with respect to the vehicle seat lower part in the vertical direction on account of an external action of force on the vehicle seat, a corresponding movement of the spring element carrier is carried out as a result of the rotatable arrangement of the spring element carrier on the first and on the second scissor arm. That is to say, in the case of a vertical deflection, that is to say a deflection in a vehicle seat vertical direction, the spring element carrier experiences a linear movement in accordance with the vehicle seat upper part. In the case of a pitching movement of the vehicle seat, that is to say in the case of a rotation of the vehicle seat upper part with respect to the vehicle seat lower part, the spring element carrier is likewise subjected to a pitching movement of this type.

According to the invention, the first scissor arm and the second scissor arm cross in the first region as viewed in the vehicle seat width direction, that is to say no structural connection is provided between the first scissor arm and the second scissor arm with the exception of the spring element carrier. This means, in particular, that, in the case of a movement of the vehicle seat upper part with respect to the vehicle seat lower part, the first region which represents the crossing region of the scissor arms has to accordingly follow the movement of the vehicle seat.

It can be provided, however, that the first scissor arm and the second scissor arm are connected in a non-positive manner, for example by way of a friction force if the scissor arms are in contact with one another.

A spring force of the spring element is brought about by way of the above-described positive guidance or positive movement of the spring element carrier on account of the movement of the vehicle seat upper part relative to the vehicle seat lower part.

Said effects on a corresponding spring element will be shown again briefly in the following text.

In accordance with one particularly preferred embodiment, the vehicle seat width direction, the second rotational axis and the third rotational axis are arranged parallel to one another. As a result, jamming of the scissor frame or the scissor frame arrangement with the spring element carrier can be prevented, in particular in the case of a relative movement of the vehicle seat upper part with respect to the vehicle seat lower part.

In accordance with a further preferred embodiment, the first scissor arm is connected by means of a first locating bearing to the vehicle seat lower part and by means of a first floating bearing to the vehicle seat upper part, and the second scissor arm is connected by means of a second locating bearing to the vehicle seat upper part and by means of a second floating bearing to the vehicle seat lower part.

Particularly advantageously, as viewed in a vehicle seat longitudinal direction, the first locating bearing is arranged in front of the second locating bearing, and the second floating bearing is arranged behind the first floating bearing; or the first locating bearing is arranged behind the second locating bearing, and the second floating bearing is arranged in front of the first floating bearing.

Here, the length of a section of the first scissor arm from the first floating bearing to the first region and a length of the section from the first region as far as the first floating bearing of the first scissor arm are particularly preferably configured with different lengths in a first state. The same can also apply to the second scissor arm. That is to say, starting from the first region towards the vehicle seat upper part, different lengths of the scissor arms are provided than from the first region towards the vehicle seat lower part. Lengths with regard to the first region can preferably be specified in an improved manner by way of the specification of a first crossing point which can be defined as a centre point of the first region. For example, the first region is a trapezoid or a parallelogram, the point of intersection of the diagonals of which represents the centre point and accordingly the first crossing point.

As a result, a certain asymmetry of the scissor frame or the scissor frame arrangement can be achieved as viewed in the vehicle seat longitudinal direction. A configuration of this type can follow a pitching movement of the vehicle seat upper part with respect to the vehicle seat lower part in a particularly satisfactory manner.

In accordance with a further preferred embodiment, the first scissor arm is connected by means of a first floating bearing to the vehicle seat upper part and by means of a third floating bearing to the vehicle seat lower part, and the second scissor arm is connected by means of a second floating bearing to the vehicle seat lower part and by means of a fourth floating bearing to the vehicle seat upper part. In particular, a first connecting element connects the first scissor arm and the vehicle seat lower part to one another, and a second connecting element connects the second scissor arm and the vehicle seat upper part to one another.

In accordance with the refinement of the first scissor arm and the second scissor arm by means of four floating bearings for connecting to the vehicle seat upper part and the vehicle seat lower part, it is achieved that, in the case of a pitching movement of the vehicle seat and in the case of a corresponding following of the vehicle seat upper part with respect to the vehicle seat lower part, a more pronounced pitching movement of the vehicle seat is obtained. A further reason for this refinement is that the vehicle seat upper part is arranged substantially exactly above the vehicle seat lower part, in particular in the case of a vertical movement, by way of the connecting part which is connected to the vehicle seat upper part.

In order to further minimize the degrees of freedom here, however, a first connecting element and a second connecting element are correspondingly provided which minimize the degrees of freedom of the four floating bearings by way of the corresponding arrangement with the first and second scissor arm and the vehicle seat upper part and the vehicle seat lower part.

Here, in accordance with a further embodiment, in a vehicle seat longitudinal direction, the first floating bearing is particularly advantageously arranged in front of the second floating bearing, and the third floating bearing is arranged in front of the fourth floating bearing. A certain asymmetry is also achieved here by way of a corresponding arrangement, in particular also with a change in the lengths of the scissor frame or the scissor arms, as described above. Here, the length of the first floating bearing from the first rotational axis differs from the length of the first rotational axis as far as the third floating bearing. This applies accordingly to the second floating bearing and the fourth floating bearing.

In accordance with a further preferred embodiment, the spring element is a leaf spring element. The said leaf spring element is particularly preferably connected on one side to the spring element carrier in a flexurally stiff manner, and is connected in a sliding manner to the second connecting element. The leaf spring element can preferably be connected on one side to the second connecting element and on the other side can be connected in a sliding manner to the spring carrier element by way of a linear guide element in the vehicle seat longitudinal direction, the leaf spring element preferably being connected fixedly to the second connecting element so as to rotate with it.

The second connecting element is particularly preferably configured to be so long that, in a non-pivoted position of the vehicle seat, that is to say first of all no action of force is provided on the vehicle seat, the leaf spring element is arranged so as to extend in the vehicle seat longitudinal direction and the vehicle seat width direction. This means, in particular, that the leaf spring does not produce any force, since it is not yet bent or is just being bent. As has already been mentioned above, the connection of the leaf spring element to the second connecting element is a sliding connection here, with the result that, in the case of a pitching movement, that is to say a movement of the vehicle seat upper part with respect to the vehicle seat lower part, the length of the leaf spring element between the sliding connection and the flexurally stiff connection to the spring carrier element can be adapted automatically in a corresponding manner. In the case of a pitching movement being carried out, the leaf spring element tracks the pitching movement of the vehicle seat upper part and the spring carrier element in accordance with the sliding connection to the second connecting element, and the leaf spring element is bent in the process, with the result that a spring force or a restoring force is produced.

In accordance with a further preferred embodiment, the spring element is an elastically deformable air spring which is connected to the vehicle seat upper part or the vehicle seat lower part.

As a result of a pitching movement of the vehicle seat and corresponding tracking of the spring carrier element which is connected to the elastically deformable air spring, a deformation of the elastically deformable air spring is brought about by way of the spring carrier element, as a result of which a spring force or a restoring force of the elastically deformable air spring is produced.

In accordance with a further preferred embodiment, the spring element has a first tension spring and a second tension spring, the first tension spring being connected to the first scissor arm and the spring element carrier, and the second tension spring being connected to the second scissor arm and the spring element carrier.

As a result of a pitching movement of the vehicle seat and the resulting movement of the spring element carrier, a spring force or a restoring force of the corresponding tension spring is brought about in a manner which is dependent on the direction of the pitching movement by way of tension action on the first tension spring or the second tension spring.

In accordance with one particularly preferred embodiment, the spring element carrier is of U-shaped configuration with a first limb, a second limb and a limb connection, the second rotational axis and the third rotational axis being at the same spacing from the limb connection as viewed in the direction of the limbs.

As a result of the spacing of the second rotational axis and the third rotational axis from the limb connection, a lever arm is configured between the connecting line of the second rotational axis and the third rotational axis and the spring carrier element, in particular the limb connection, which leads overall to a torque in the case of loading by way of, for example, a spring, which torque acts as a restoring moment for the pitching spring system. Here, the magnitude of the torque is of course dependent on the spring force of the corresponding spring element and the spacing of the second and third rotational axis from the limb connection.

Here, in accordance with one particularly preferred embodiment, the second rotational axis and the third rotational axis are arranged above or below the first rotational axis as viewed in a vehicle seat vertical direction for the improved introduction of the spring force to the spring element carrier.

BRIEF DESCRIPTION OF THE DRAWINGS

Further advantageous embodiments result from the sub-claims.

Further aims, advantages and expediencies of the present invention can be gathered from the following description in conjunction with the drawings, in which:

FIGS. 5A-B show a vehicle seat with a further example of a spring element, FIGS. 6A-6B show a vehicle seat with a first arrangement of the spring carrier element.

DETAILED DESCRIPTION

Figure 1A:
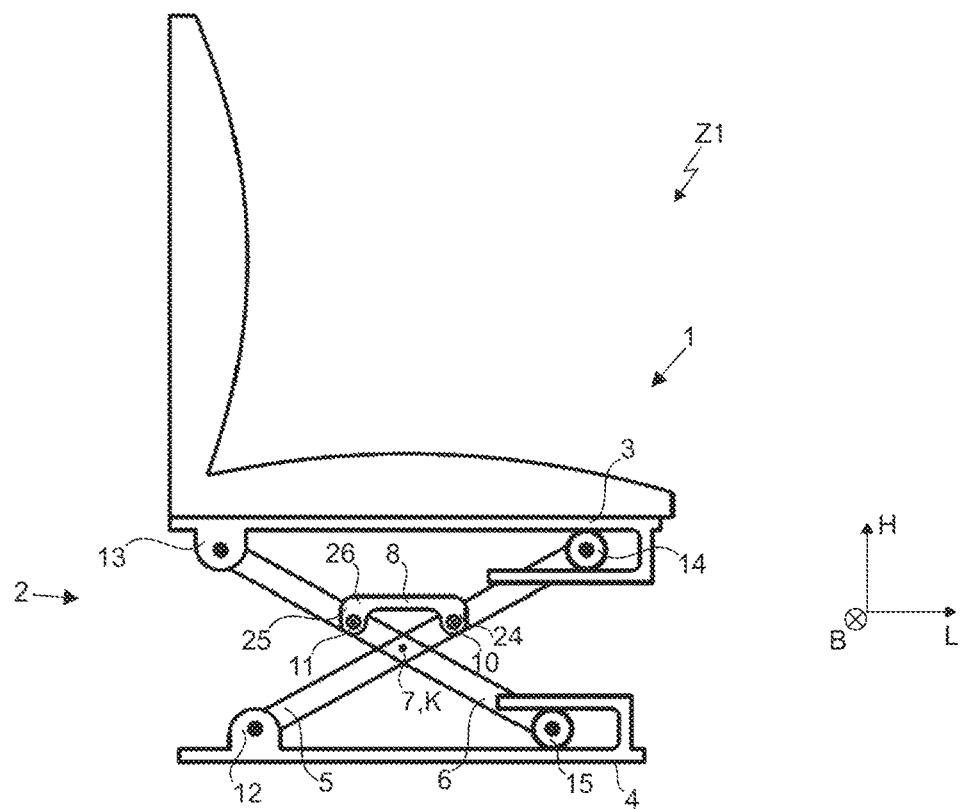
FIGS. 1A-1C show a vehicle seat in a first state and in a second state.

A vehicle seat 1 can be seen in FIG. 1A, comprising a pitching spring system 2, a vehicle seat upper part 3 and a vehicle seat lower part 4. The vehicle seat upper part 3 is connected to the vehicle seat lower part 4 by means of a scissor frame arrangement comprising a first scissor arm 5 and a second scissor arm 6, with the result that a relative movement of the vehicle seat upper part 3 with respect to the vehicle seat lower part 4 is possible. Here, the first scissor arm 5 and the second scissor arm 6 are arranged so as to cross with one another, with a first region K or crossing region K with a first crossing point 7, as viewed in the vehicle seat width direction B. Furthermore, a spring carrier element 8 is provided which is connected rotatably to the first scissor arm 5 and the second scissor arm 6, respectively to the first scissor arm 5 about a second rotational axis 10 and to the second scissor arm 6 about a third rotational axis 11.

In the case of a movement of the vehicle seat upper part 3 relative to the vehicle seat lower part 4, the scissor frame with the first scissor arm 5 and the second scissor arm 6 is moved accordingly, with the result that the crossing region K or the crossing point 7 is shifted accordingly on account of the said movement.

Here, the scissor frame or the scissor frame arrangement is configured in such a way that the first scissor arm 5 is connected by means of a first locating bearing 12 to the vehicle seat lower part 4 and by means of a first floating bearing 14 to the vehicle seat upper part 3. Here, the second scissor arm 6 is connected by means of a second locating bearing 13 to the vehicle seat upper part 3 and by means of a second floating bearing 15 to the vehicle seat lower part 4.

Here, the spring element carrier 8 is of U-shaped configuration, and has a first limb 24, a second limb 25 and a limb connection 26, the limbs 24, 25 being connected to the limb connection 26. Here, the spring element carrier 8 is connected by means of the limbs 24, 25 to the corresponding scissor arm 5, 6.

Here, FIG. 1A shows the vehicle seat 1 in a first state Z1, that is to say the vehicle seat 1 is situated in a non-pivoted position or a non-pivoted state, that is to say there is no external action of force on the vehicle seat 1.

Figure 1B:
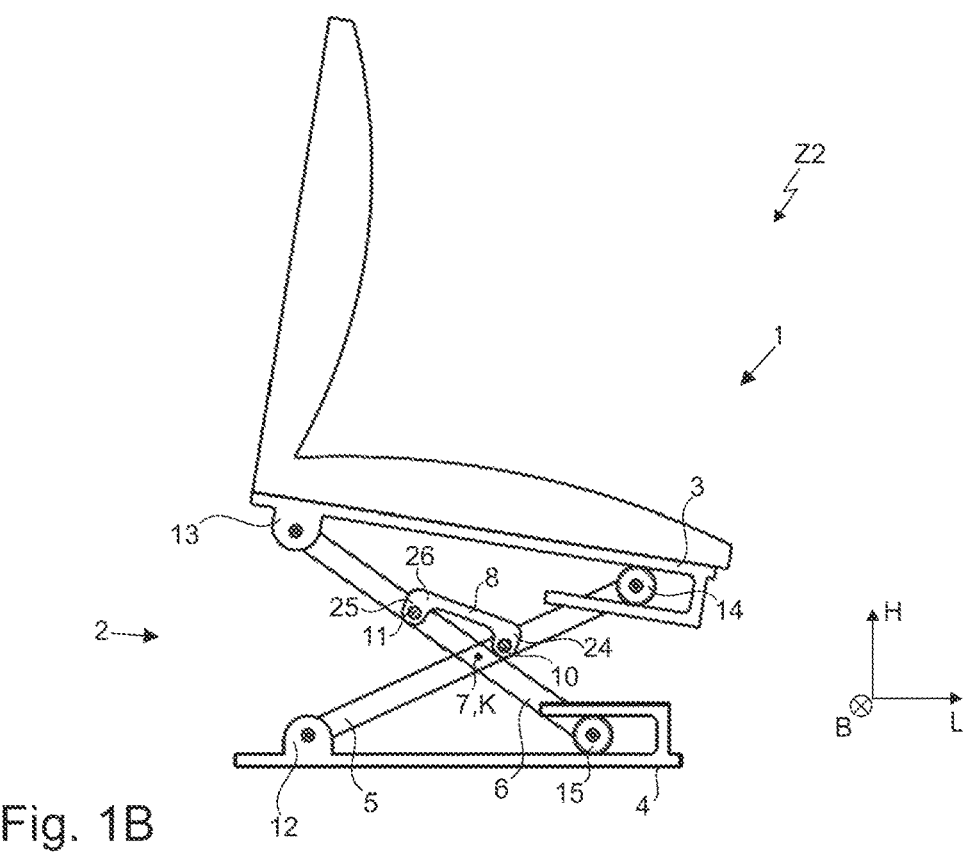

In contrast, however, FIG. 1B shows the vehicle seat 1 in a second state Z2, that is to say the vehicle seat is pitched towards the front in this case on account of a pitching movement of the vehicle or the vehicle seat 1.

As can be gathered accordingly from the comparison of FIGS. 1A and 1B, the vehicle seat upper part 3 is tilted with respect to the vehicle seat lower part 4 in the case of a pitching movement of the vehicle seat 1, as a result of which the spring element carrier 8 correspondingly tracks the movement of the vehicle seat upper part 3 on account of its connection to the scissor arms 5, 6.

Figure 1C:
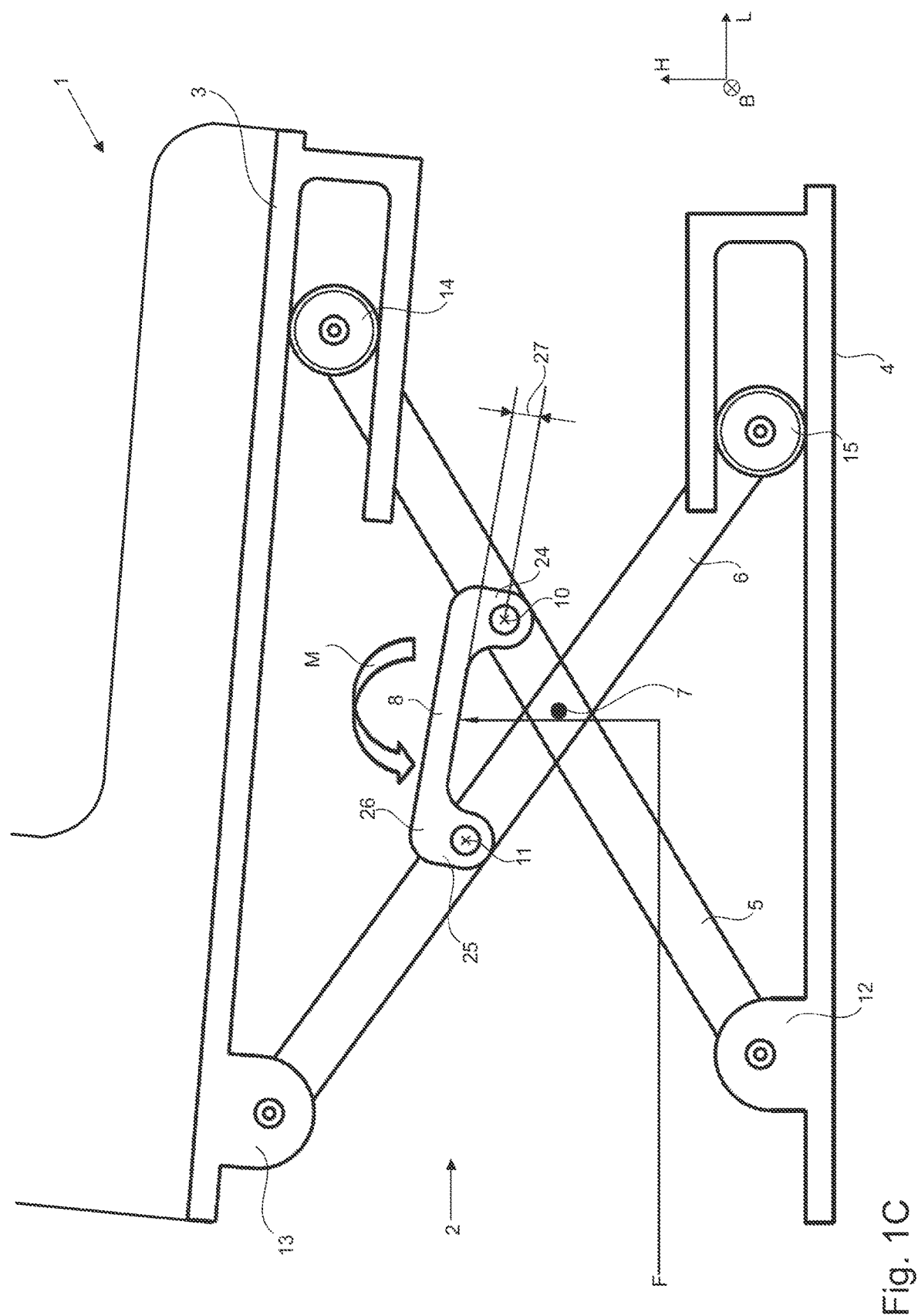

It is noted with regard to FIGS. 1A and 1B that a spring element has initially not been shown, since the general functional principle can be seen independently of the type of spring element. The general functional principle is described in greater detail on the basis of FIG. 1C.

As can be seen, the vehicle seat 1 is situated in the second state Z2, that is to say in a pitched position.

By virtue of the fact that there is a spacing 27 of the second rotational axis 10 from the limb connection 26 as viewed in the direction of the limb 24, a restoring moment or torque M which is shown correspondingly by way of the arrow is produced by means of a spring force F which acts on the spring element (not shown) as a result of the pitching movement. In other words, the spacing 27 is the spacing between the connecting line of the second rotational axis 10 and the third rotational axis 11 from the limb connection 26.

Here, the magnitude of the restoring moment M is of course dependent firstly on the introduced spring force F and secondly on the magnitude of the spacing 27. That is to say, in particular, that, in the case of a pronounced pitching movement of the vehicle seat or the vehicle seat upper part 3, a great introduction of force to the corresponding spring element (not shown here) leads to a great or greater restoring moment M.

Here, the spacing 27 is to be equated with a corresponding lever arm which is provided for the restoring moment M.

Figure 5A:
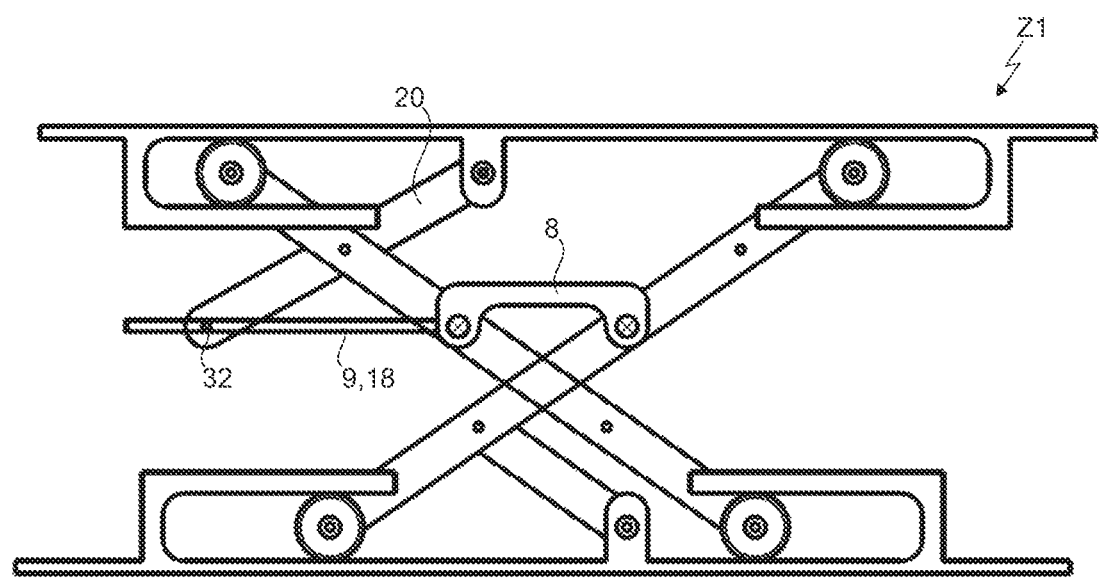

Here, this principle is independent of the type of spring element and/or independent of the type of embodiment of the scissor frame or the scissor arms, with the exception of the embodiments which are shown in FIGS. 5A and 5B.

Figure 2A:
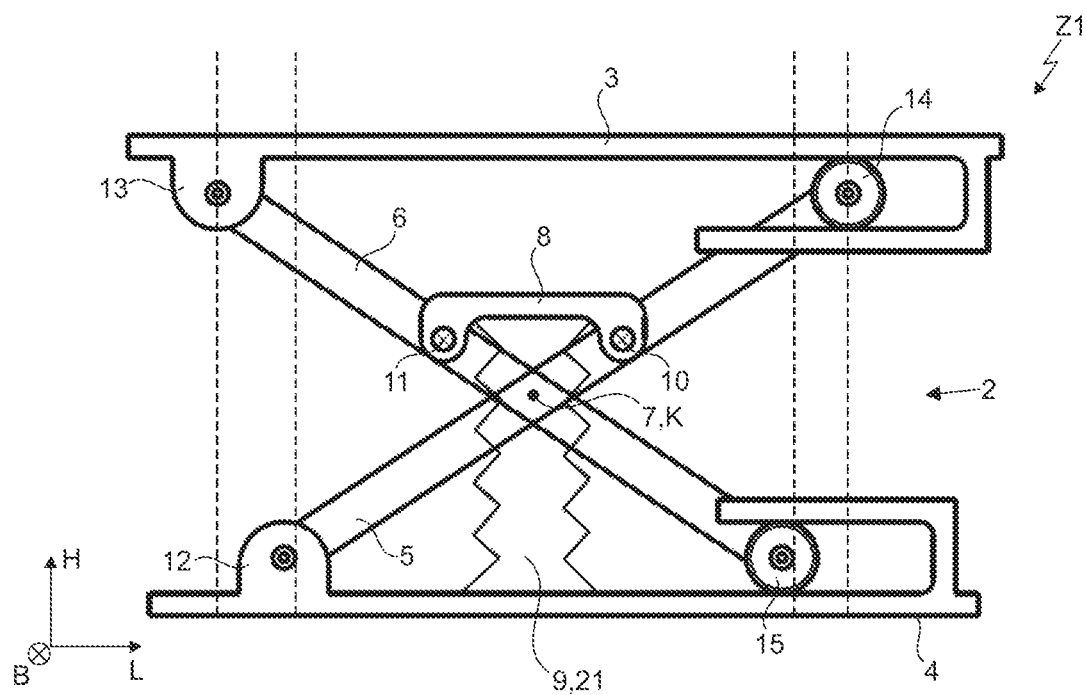
FIGS. 2A-2H show a vehicle seat in a very wide variety of states with an air spring as a spring element with a first scissor frame arrangement.
Figure 2B:
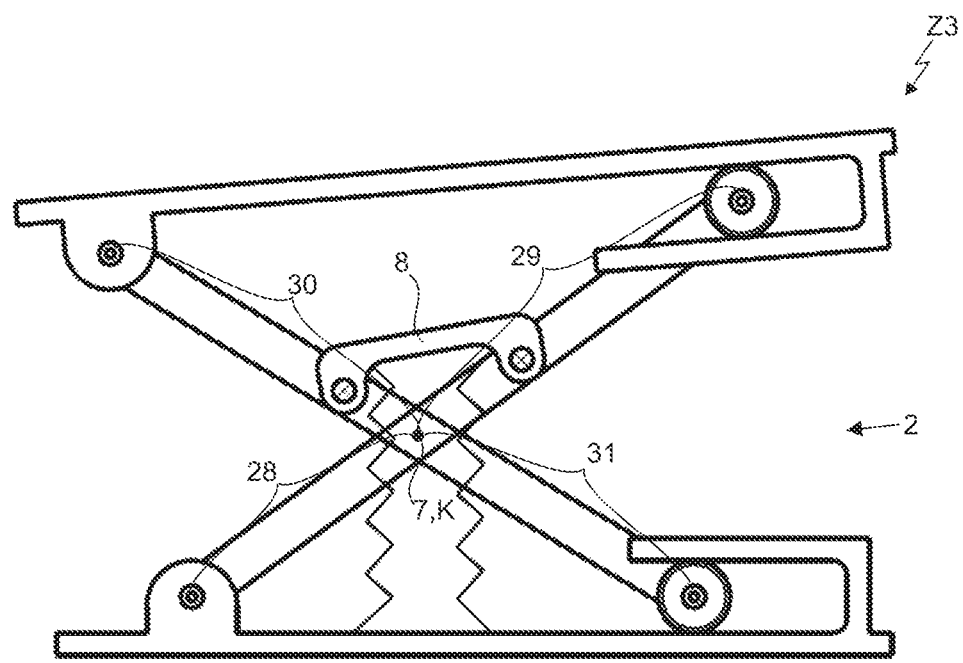
Figure 2C:
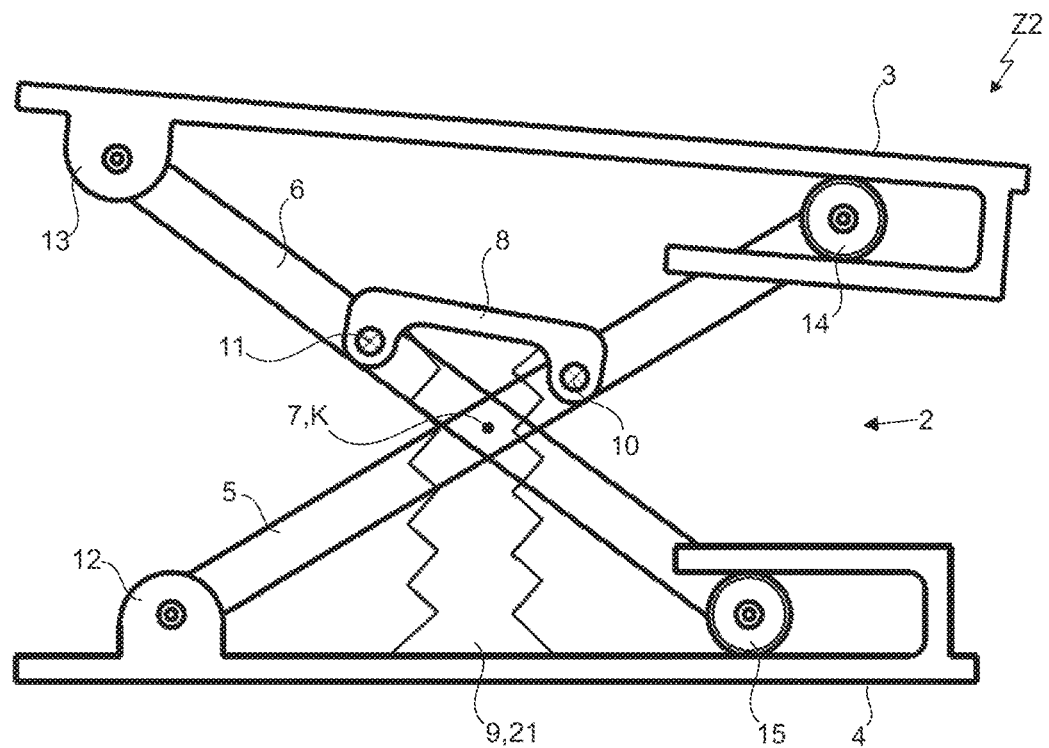
Figure 2D:
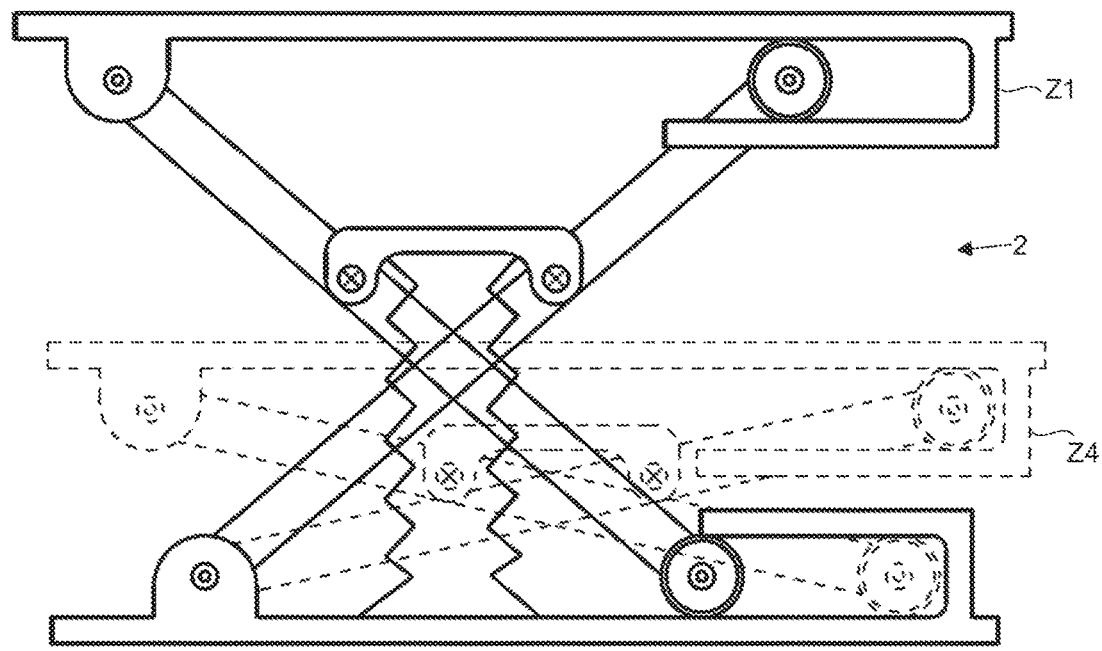
Figure 2E:
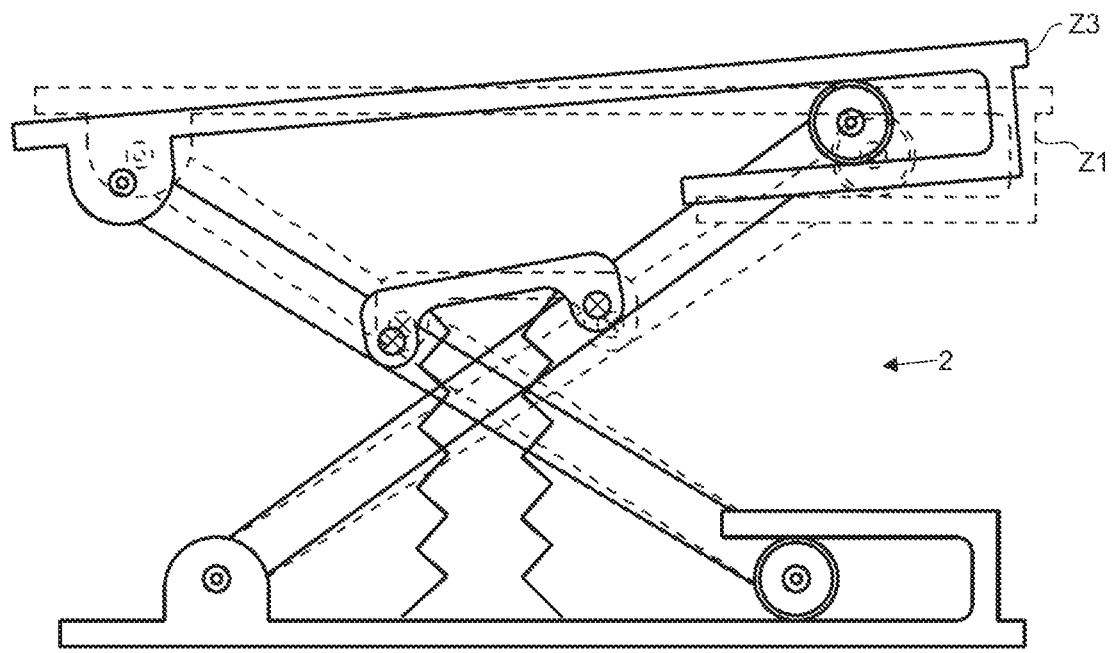
Figure 2F:
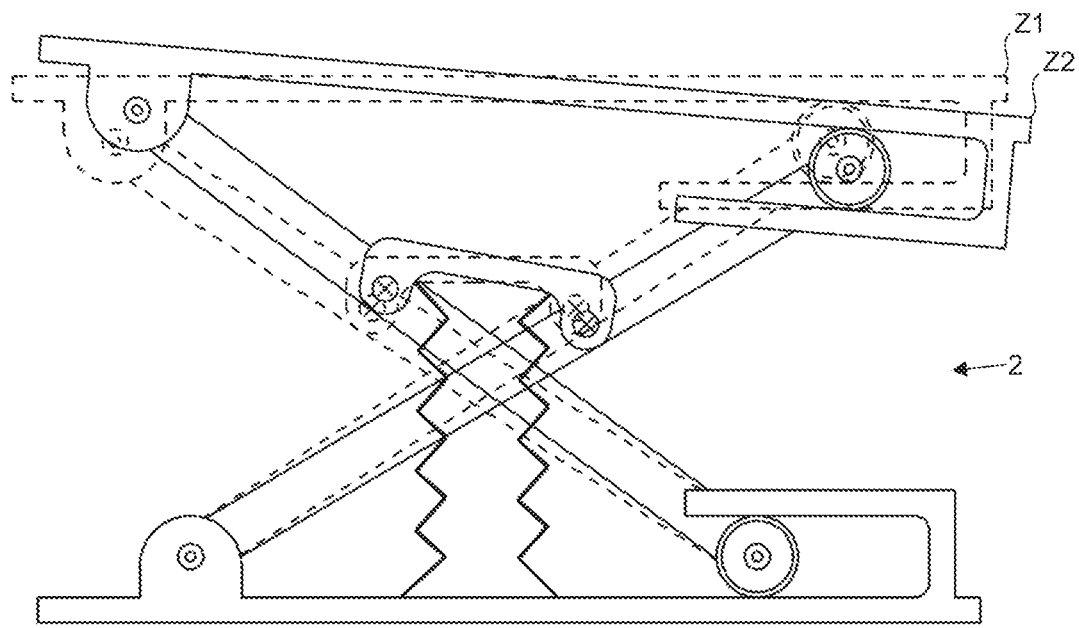
Figure 2G:
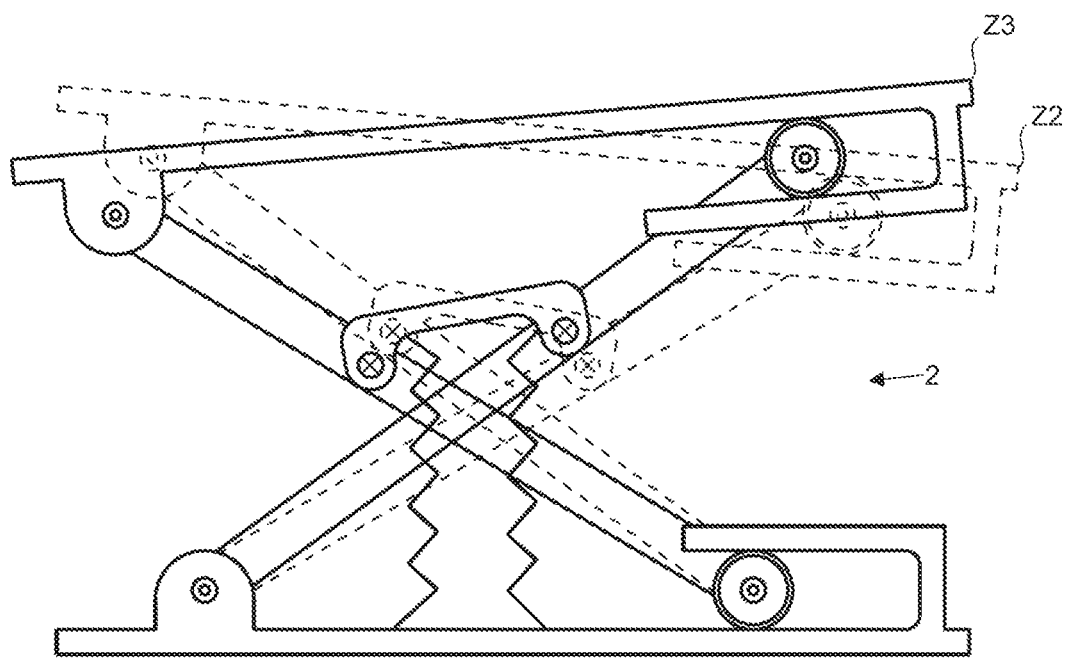
Figure 2H:
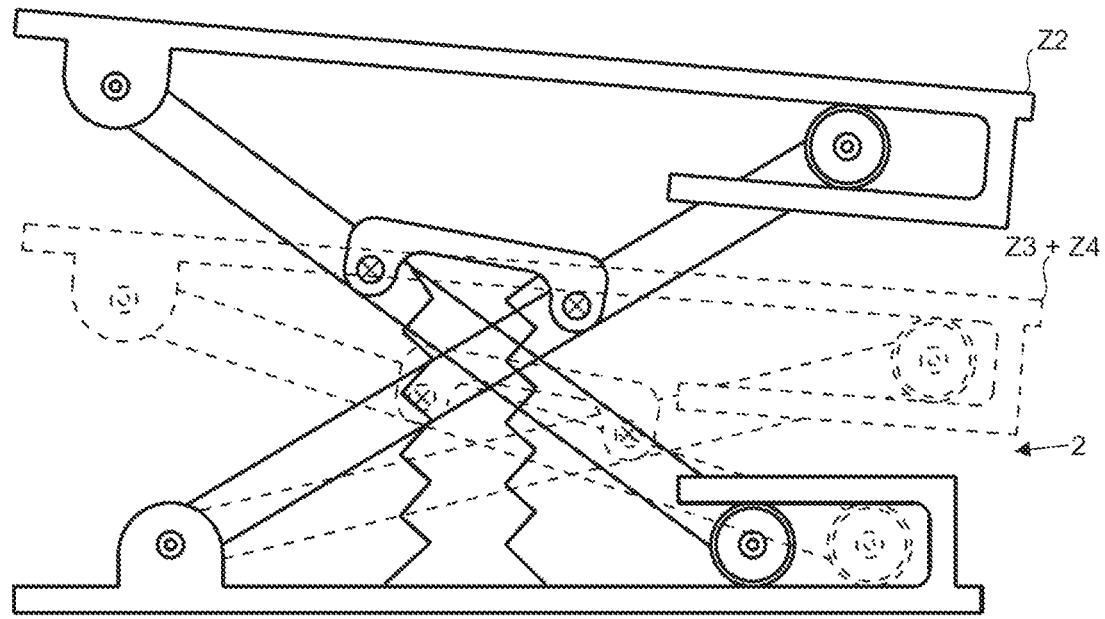

That is to say, in particular, that various embodiments of the present invention can be combined with one another, and corresponding refinements with regard to the spring element and the scissor frame or the scissor frame arrangement can be interchanged and combined as desired. Here, FIGS. 2A-2H show a vehicle seat according to FIG. 1A with a spring element 9 which is configured in the present case as an elastically deformable air spring 21. Here, FIG. 2A shows a vehicle seat in a first state Z1, FIG. 2B shows the vehicle seat 1 in the state Z3, FIG. 2C shows the vehicle seat in the state Z2, FIG. 2D shows a comparison between the state Z1 and a state Z4, FIG. 2E shows a comparison between the states Z1 and Z3, FIG. 2F shows a comparison between the states Z1 and Z2, FIG. 2G shows a comparison of the states Z2 and Z3, and FIG. 2H shows a comparison of the state Z2 and the states Z2+Z4.

For further clarification, here is the meaning of the states again:

Z1 is the state without an action of force on the vehicle seat, Z2 is a second state which denotes a pitching movement towards the front as seen in the vehicle seat longitudinal direction L, Z3 is a third state which denotes a pitching movement towards the rear as seen in the vehicle seat longitudinal direction L, and Z4 denotes a vertical movement of the vehicle seat upper part 3 with respect to the vehicle seat lower part 4.

As a result of the movement of the vehicle seat upper part 3 with respect to the vehicle seat lower part 4 in at least one of the states Z2, Z3, Z4, the spring element 9 which is configured here as an elastically deformable spring 21, the spring element 9 or the air spring 21 is deformed elastically, as a result of which a spring force F acts on the spring element carrier 8. As a result of bringing about of a spring force F on the spring element carrier 8 in combination with that lever of the spring element carrier which is represented by way of the spacing 27, a restoring moment or torque M is produced which counteracts the corresponding movement of the vehicle seat upper part 3 with respect to the vehicle seat lower part 4. This applies accordingly to each of the states Z2, Z3, Z4.

As can be seen, furthermore, as viewed in the vehicle seat longitudinal direction L, the first locating bearing 12 is arranged in front of the second locating bearing 13, and the first floating bearing is arranged in front of the second floating bearing 15. It can be seen, furthermore, that a first length 28 and a second length 29 of the first scissor arm 5 are configured with different lengths. This applies, in particular, to the vehicle seat 1 in the first state Z1. Here, the first length 28 is to be understood to mean the spacing between the crossing point 7 and the corresponding rotational axis of the first locating bearing 12. Accordingly, the second length 29 is to be understood to mean the length of the spacing of the crossing point 7 as far as the rotational axis of the first floating bearing 14. This applies correspondingly to the spacings 30 and 31 of the second scissor arm 6. Here, the first length 28 is smaller than the second length 29, and the fourth length 31 is smaller than the third length 30. As a result, a certain asymmetry is brought about in the vehicle seat in the case of a pitching movement and/or a spring system movement of the vehicle seat 1.

Moreover, the first length 28 and the second length 29 determine a transmission ratio of a stroke movement of the spring system to a stroke movement of the spring element carrier 8 in the vertical direction. The adaptation of the first length 28 and the second length 29 can advantageously achieve a situation where a comparatively great stroke of the overall spring system is achieved by way of a relatively short elastic air spring 21.

FIGS. 3A-3E show a further embodiment of the scissor frame or the scissor frame arrangement, the first scissor arm 5 and the second scissor arm 6 being connected here in each case via two floating bearings on one side to the vehicle seat upper part 3 and on the other side to the vehicle seat lower part 4. That is to say, the above-described locating bearings have been replaced here by further floating bearings. Specifically, the first scissor arm 5 is then connected by means of a first floating bearing 14 to the vehicle seat lower part and by means of a third floating bearing 16 to the vehicle seat upper part 3. Correspondingly, the second scissor arm 6 is connected by means of a second floating bearing 15 to the vehicle seat lower part 4 and by means of a fourth floating bearing 17 to the vehicle seat upper part 3. Since an arrangement of this type of the scissor arms 5, 6 by means of floating bearings 14, 15, 16, 17 would bring about undefined guidance of the vehicle seat upper part 3 with respect to the vehicle seat lower part 4, it is necessary that a first connecting element 19 is provided which is connected on one side to the first scissor arm 5 and on the other side to the vehicle seat lower part 4. Furthermore, a second connecting element 20 is provided which is connected to the second scissor arm on one side and to the vehicle seat upper part 3 on the other side. In particular, the first connecting element 19 and the second connecting element 20 are connected in each case rotatably to the corresponding scissor arm 5, 6 and rotatably to the vehicle seat upper part 3 or the vehicle seat lower part 4.

The degrees of freedom of the scissor frame with the scissor arms 5 and 6 are reduced again by way of the attachment of the scissor arms 5, 6 to the vehicle seat upper part 3 and the vehicle seat lower part 4 by means of the first connecting element 19 and the second connecting element 20, respectively.

Particularly preferably, the first connecting element 19 is connected to the first scissor arm 5 such that it can be rotated about a fourth rotational axis 34 and is connected to the vehicle seat lower part 4 such that it can be rotated about a fifth rotational axis 35, and the second connecting element 20 is connected to the second scissor arm 6 such that it can be rotated about a sixth rotational axis 36 and is connected to the vehicle seat upper part 3 such that it can be rotated about a seventh rotational axis.

In accordance with a further preferred embodiment, a first spacing of the first floating bearing 14 from the fourth rotational axis 35 is equal to a second spacing of the fifth rotational axis 35 from the fourth rotational axis 35 and is equal to a third spacing of the fourth rotational axis 35 from a centre axis 38 of the first swing arm 5 or a centre bearing 38 of the third swing arm 5. As a result of the said arrangement, the centre axis is therefore guided substantially exactly over the third rotational axis, with the result that no horizontal movement of the centre axis with respect to the third rotational axis takes place as a result. The same preferably also applies to the second connecting element 20.

Here, the terms "centre bearing" and "centre axis" can be used synonymously.

Here, the centre axis can in principle be selected arbitrarily. By way of the position of the centre axis, the transmission ratio is determined of the swing arm from the overall stroke of the upper part with respect to the lower part to that stroke of the first spring element which is preferably arranged between the first element carrier and the second element carrier or the base plate.

Exact guidance as described above is achieved if the centre axis, the fourth rotational axis and the second rotational axis lie on a common course, and the fourth rotational axis describes half the length of the distance from the centre axis to the second rotational axis.

Another characteristic of the pitching movement, in particular, is possible, however, by way of a refinement of this type of the scissor frame.

Figure 3A:
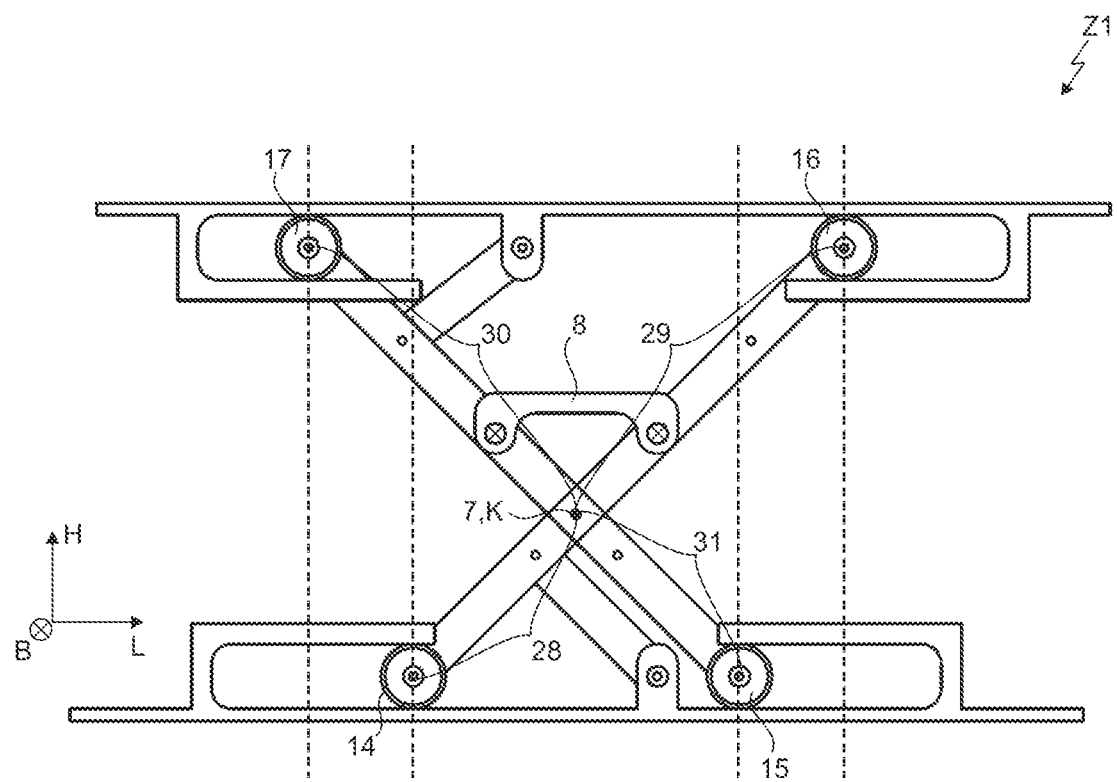
FIGS. 3A-3E show a vehicle seat in a very wide variety of states with a second scissor frame arrangement.
Figure 3B:
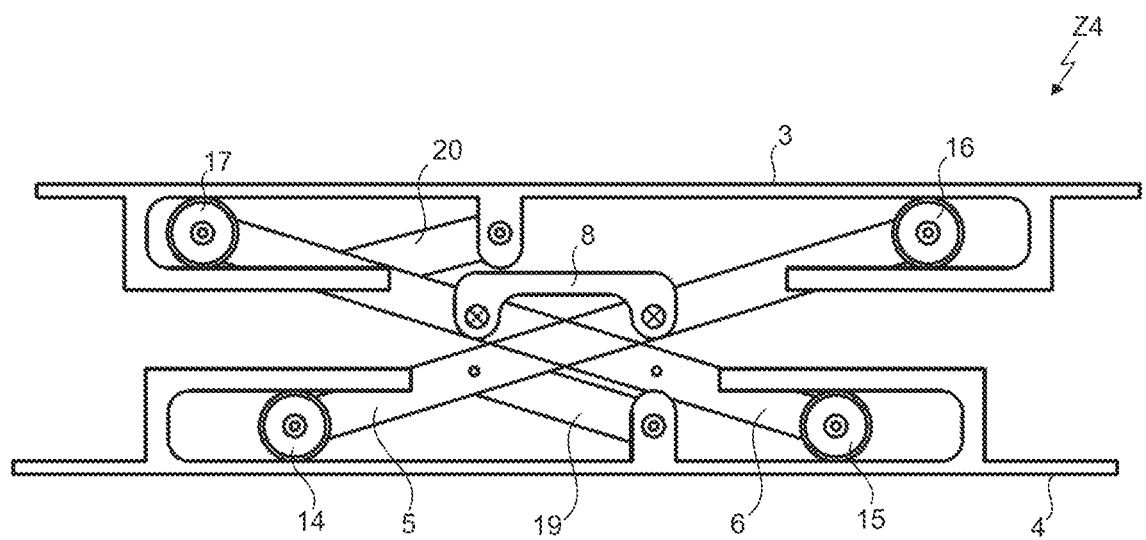
Figure 3C:
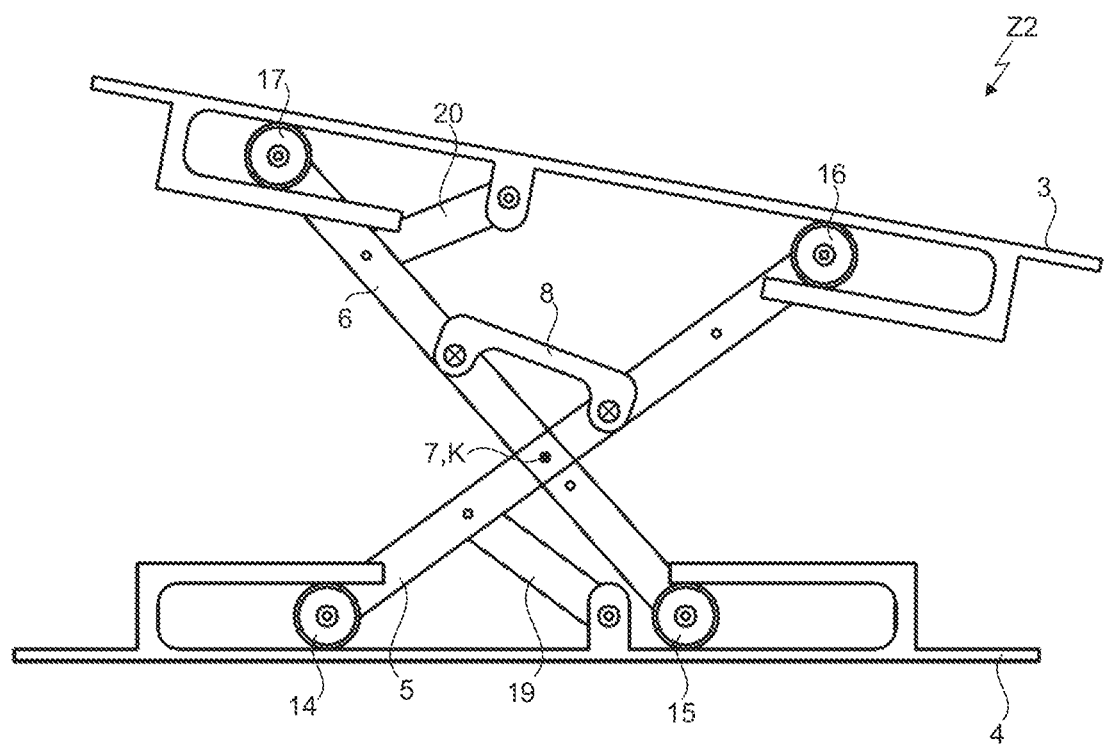
Figure 3D:
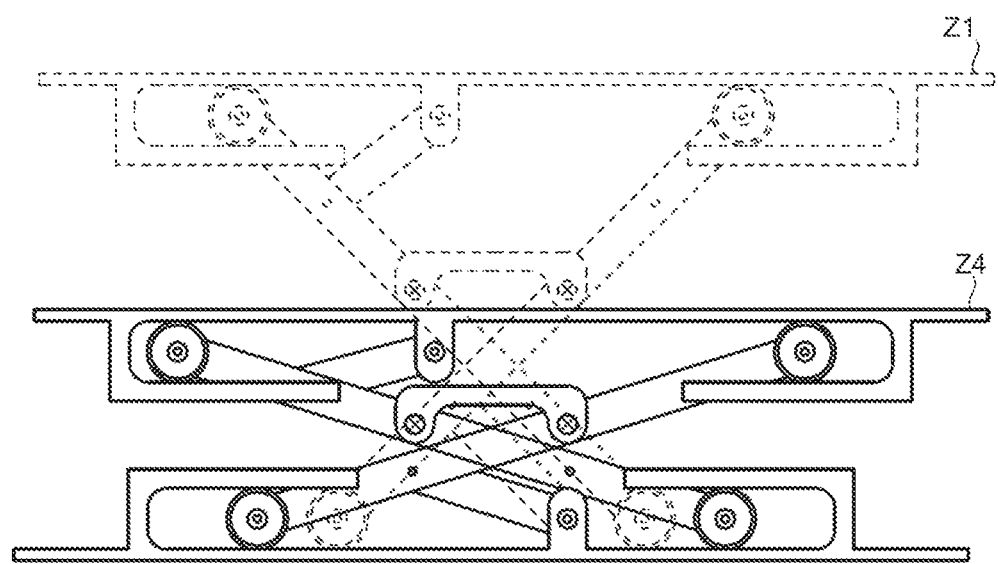
Figure 3E:
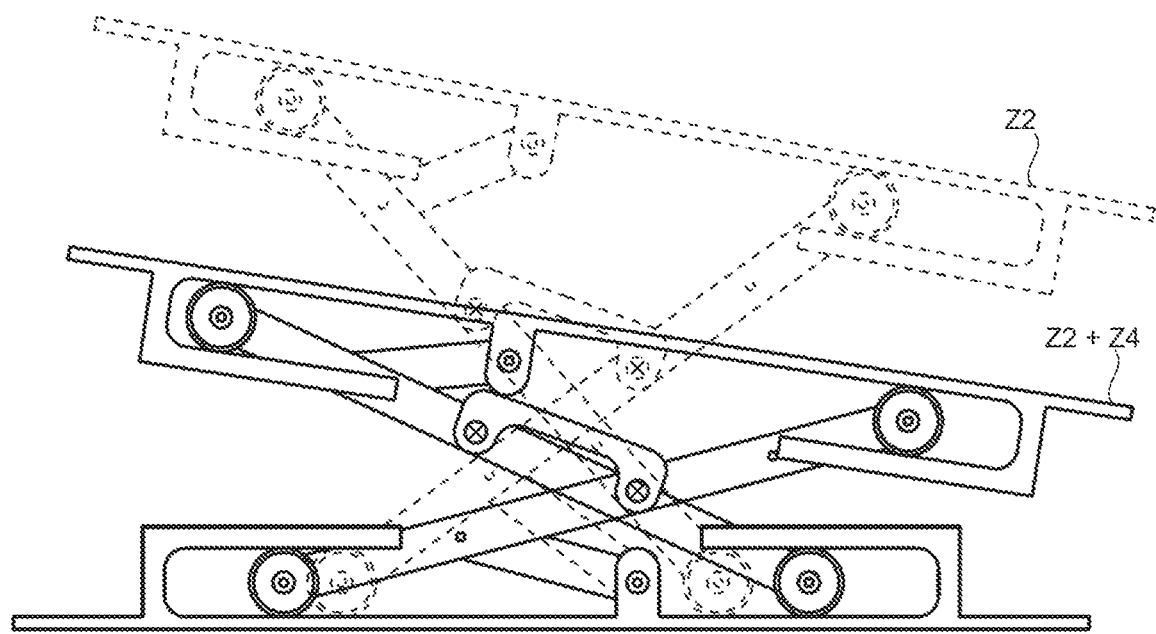

Here, FIG. 3A shows the vehicle seat 1 in the first state Z1, FIG. 3B shows the vehicle seat 1 in the state Z4, FIG. 3C shows the vehicle seat 1 in the state Z2, FIG. 3D shows the vehicle seat 1 in a comparison between the positions or states 1 and Z4, and FIG. 3E shows a comparison between the states Z2 and the combination of states Z2 and Z4.

It can also be seen here that, as viewed in the vehicle seat longitudinal direction L, the first floating bearing 14 is arranged in front of the fourth floating bearing 17, and the second floating bearing 15 is arranged behind the third floating bearing 16, it also being possible, depending on the transmission ratio, for the first floating bearing 14 to be arranged behind the fourth floating bearing 17 and for the second floating bearing 15 to be arranged in front of the third floating bearing 16.

The first length 28 from the first floating bearing 14 as far as the crossing point 7, the second length 29 from the first rotational axis as far as the third floating bearing 16, the third length 30 from the crossing point 7 as far as the fourth floating bearing, and the fourth length 31 from the crossing point 7 as far as the second floating bearing 15 are likewise configured in a manner which corresponds to the preceding examples according to FIGS. 2A-2H, that is to say the first length 28 is smaller than the second length 29, and the fourth length 31 is smaller than the third length 30.

As can be gathered from FIGS. 3A-3E, no spring element is initially shown. It is possible, however, that, in accordance with FIGS. 2A-2H, a spring element in the form of an elastically deformable air spring 21 is provided and is arranged accordingly.

Further embodiments with regard to the spring elements can be gathered from the following figures.

For example, FIGS. 4A and 4B and FIGS. 5A and 5B show two further embodiments of a spring element 9.

Figure 4A:
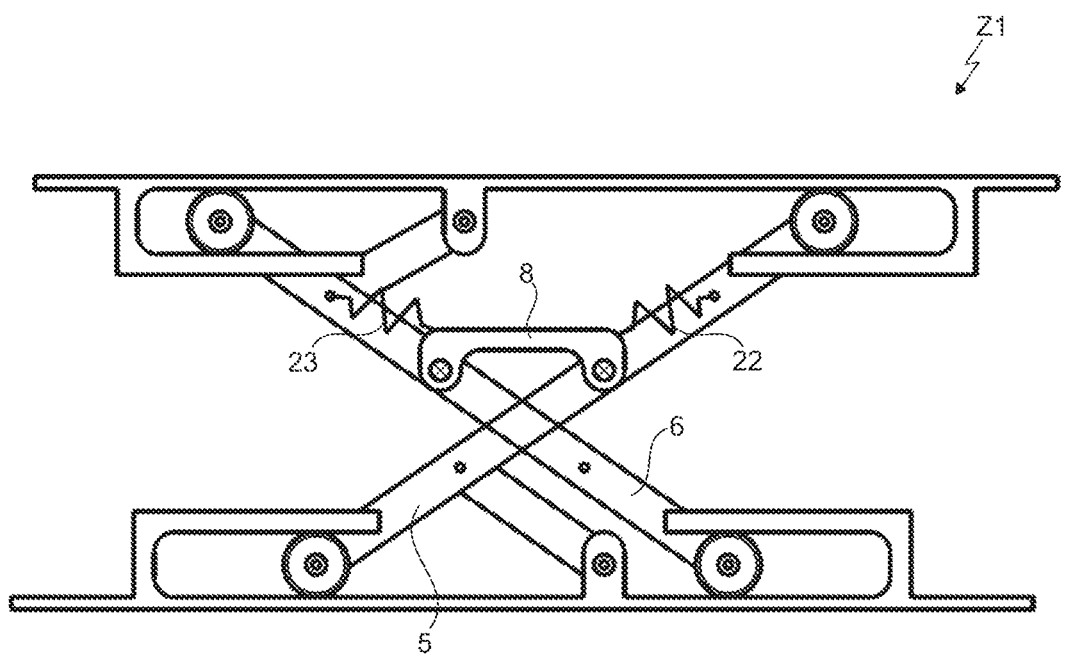
FIGS. 4A-4B show a vehicle seat with a further example of a spring element.
Figure 4B:
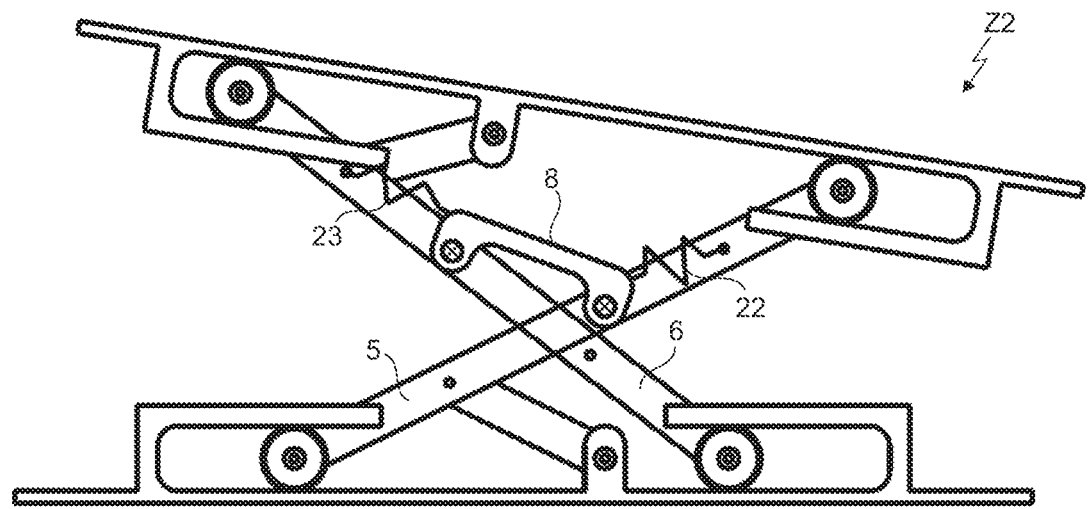

Here, the spring element of FIGS. 4A and 4B consists of a first tension spring 22 and a second tension spring 23. Here, the first tension spring 22 is connected on one side to the spring element carrier 8 and on the other side to the first scissor arm 5. The second tension spring 23 is likewise connected to the spring element carrier 8 and is connected on the other side to the second scissor arm 6.

It can be seen from a comparison of FIGS. 4A and 4B with one another that the second tension spring 23 is stretched in accordance with the movement of the scissor frame or the spring element carrier 8 by a change of the state Z1 to a state Z2, that is to say in the case of a pitched state of the vehicle seat 1. As a result, a spring force F is likewise produced which acts on the spring element carrier 8 and thus correspondingly in turn produces a return moment M.

FIGS. 5A and 5B show a further embodiment of a spring element, the spring element being configured in the present case by way of a leaf spring element 18. Here, the leaf spring element 18 is connected on one side in a flexurally stiff manner to the spring element carrier 8 and is connected on the other side by means of a sliding connection to the second connecting element 20. The sliding connection of the leaf spring element 18 to the second connecting element 20 is indicated by way of the reference sign 32. The second connecting element 20 can also have an extension region, the extension region being connected in a sliding manner to the leaf spring element 18.

The functional principle of the leaf spring is presented again by way of a comparison of FIGS. 5A and 5B, FIG. 5A showing the vehicle seat 1 in the state Z1 and FIG. 5B showing the vehicle seat 1 in the state Z2. In the case of the pitching movement of the vehicle seat 1 in the vehicle seat longitudinal direction L towards the front, the leaf spring element is bent on account of the flexurally stiff connection of the leaf spring element 18 to the spring element carrier 8 and the sliding connection 32, as a result of which a restoring force F on the spring element carrier 8 is brought about. As a result of the sliding connection 32, a protruding proportion 33 of the leaf spring element 18 can track the movement of the leaf spring element on account of the flexurally stiff connection to the spring element carrier 8.

Here, FIGS. 6A-6D show two different embodiments with regard to the arrangement of the spring element carrier 8 with regard to the first region K or the crossing point 7, that is to say as viewed in the vehicle seat vertical direction H of the vehicle seat 1.

Figure 6B:
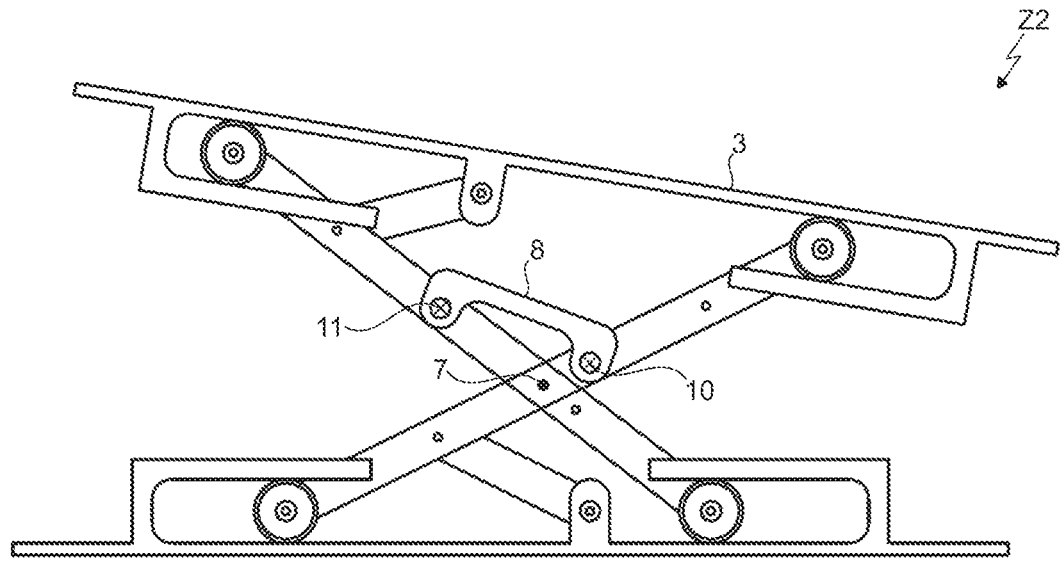
Figure 6C:
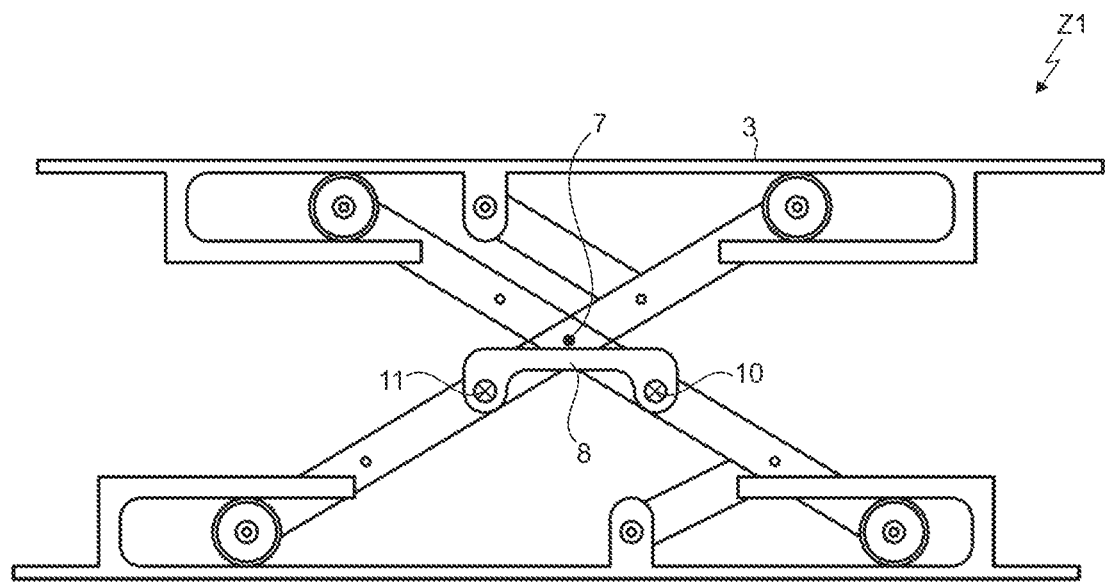
FIGS. 6C-6D show a vehicle seat with a second arrangement of the spring carrier element.
Figure 6D:
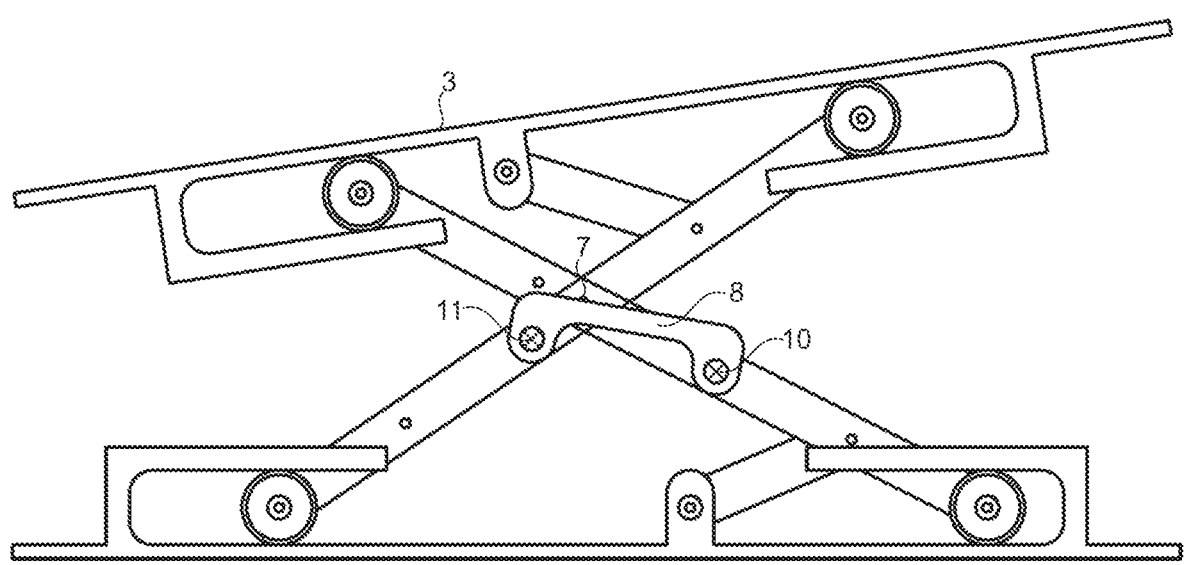

Here, FIGS. 6A and 6B show a first embodiment, and FIGS. 6C and 6D show a second embodiment with regard to the fastening of the spring element carrier 8.

As can be gathered from FIGS. 6A and 6B, FIG. 6A shows the vehicle seat 1 in the first state Z1, and FIG. 6B shows it in the state Z2. Here, in each of the said states, the second rotational axis 10 and the third rotational axis 11 are arranged above the first region K or the crossing point 7, as viewed in the vehicle seat vertical direction H. This also applies, in particular, to the state Z2 or the state Z3 and the state Z4, that is to say in every possible pivoted or pitched state of the vehicle seat 1.

In contrast, FIGS. 6C and 6D show one embodiment, in which the second rotational axis 10 and the third rotational axis 11 are arranged below the first region K or the crossing point 7 as viewed in the vehicle seat vertical direction H.

It can be gathered from a comparison of FIGS. 6A and 6B that, as a result of the said refinement, the spring element carrier 8 tracks the movement of the spring system upper part 3, that is to say the spring element carrier 8 tilts in the same direction as the spring system upper part 3.

In contrast, it can be gathered from the comparison of FIGS. 6C and 6D that, in the case of tilting of the vehicle seat upper part on account of pitching of the vehicle seat 1, the spring element carrier 8 moves in the opposite direction to the tilting of the vehicle seat upper part 3.

Once again in summary, any embodiments can be combined with one another and supplemented by one another in accordance with the present invention. Identical components are provided with the same reference signs, it being possible for the reference signs to be omitted for improved clarity.

All of the features which are disclosed in the application documents are claimed as essential to the invention, in so far as they are novel over the prior art individually or in combination.

LIST OF REFERENCE SIGNS

1 Vehicle seat
2 Pitching spring unit
3 Vehicle seat upper part
4 Vehicle seat lower part
5 First scissor arm
6 Second scissor arm
7 Crossing point
8 Spring element carrier
9 Spring element
10 Second rotational axis
11 Third rotational axis
12 First locating bearing
13 Second locating bearing
14 First floating bearing
15 Second floating bearing
16 Third floating bearing
17 Fourth floating bearing
18 Leaf spring element
19 First connecting element
20 Second connecting element
21 Air spring
22 First tension spring
23 Second tension spring
24 First limb
25 Second limb
26 Limb connection
27 Spacing
28 First length
29 Second length
30 Third length
31 Fourth length
32 Sliding connection
33 Proportion
34 Fourth rotational axis
35 Fifth rotational axis
36 Sixth rotational axis
37 Seventh rotational axis
Z1 First state Z2 Second state
Z3 Third state
Z4 Fourth state
K First region
L Vehicle seat longitudinal direction
B Vehicle seat width direction
H Vehicle seat vertical direction

What is claimed is:

1. A vehicle seat comprising:
a vehicle seat upper part;
a vehicle seat lower part;
a scissor frame arrangement, including:
  a first scissor arm:
  a second scissor arm, wherein the first and second scissor arms cross in a first region as viewed in a vehicle seat width direction; and
a pitching spring unit, including:
  a spring element carrier, wherein a first end of the spring element carrier is rotatably connected to the first scissor arm at a first point on a first side of a location of a crossing point between the first and second scissor arms, and wherein a second end of the spring element carrier is rotatably connected to the second scissor arm at a second point on a second side of the location of the crossing point between the first and second scissor arms; and
  a spring element, wherein the spring element is connected on one side to the vehicle seat upper part, the vehicle seat lower part or the scissor arms, and wherein the spring element is connected on the other side to the spring element carrier.

2. The vehicle seat according to claim 1, wherein a vehicle seat width direction, a rotational axis extending through the first point and a rotational axis extending through the second point are parallel to one another.

3. The vehicle seat according to claim 1, wherein the first scissor arm is connected by means of a first locating bearing to the vehicle seat lower part and by means of a first floating bearing to the vehicle seat upper part, and the second scissor arm is connected by means of a second locating bearing to the vehicle seat upper part and by means of a second floating bearing to the vehicle seat lower part.

4. The vehicle seat according to claim 3, wherein, as viewed in a vehicle seat longitudinal direction, the first locating bearing is arranged in front of the second locating bearing, and the second floating bearing is arranged behind the first floating bearing; or in that, as viewed in a vehicle seat longitudinal direction, the first locating bearing is arranged behind the second locating bearing, and the second floating bearing is arranged in front of the first floating bearing.

5. The vehicle seat according to claim 1, wherein the first scissor arm is connected by means of a first floating bearing to the vehicle seat upper part and by means of a third floating bearing to the vehicle seat lower part, and the second scissor arm is connected by means of a second floating bearing to the vehicle seat lower part and by means of a fourth floating bearing to the vehicle seat upper part, a first connecting element connecting the first scissor arm and the vehicle seat lower part to one another, and a second connecting element connecting the second scissor arm and the vehicle seat upper part to one another.

6. The vehicle seat according to claim 5, wherein, in a vehicle seat longitudinal direction, the first floating bearing is arranged in front of the second floating bearing, and the third floating bearing is arranged in front of the fourth floating bearing; or in that, in a vehicle seat longitudinal direction, the first floating bearing is arranged behind the second floating bearing, and the third floating bearing is arranged behind the fourth floating bearing.

7. The vehicle seat according to claim 5, wherein the spring element is a leaf spring element which is connected on one side to the spring element carrier in a flexurally stiff manner, and is connected in a sliding manner to the second scissor arm by means of the second connecting element; or which is connected fixedly on one side to the second connecting element so as to rotate with it and is connected in a sliding manner on the other side to the spring element carrier by way of a linear guide element in a vehicle seat longitudinal direction.

8. The vehicle seat according to claim 1, wherein the spring element is an elastically deformable air spring which is connected to the spring element carrier and to the vehicle seat upper part or the vehicle seat lower part.

9. The vehicle seat according to claim 5, wherein the spring element has a first tension spring and a second tension spring, the first tension spring being connected to the first scissor arm and the spring element carrier, and the second tension spring being connected to the second scissor arm and the spring element carrier.

10. The vehicle seat according to claim 1, wherein the spring element carrier is of U-shaped configuration with a first limb, a second limb and a limb connection, a second rotational axis and a third rotational axis being at a same spacing from the limb connection as viewed in the direction of the limbs.

11. The vehicle seat according to claim 1, wherein the first point and the second point are arranged above or below the first region as viewed in a vehicle seat vertical direction.

* * * * *